United States Patent
Ning et al.

(10) Patent No.: US 9,715,964 B2
(45) Date of Patent: Jul. 25, 2017

(54) CERAMIC CAPACITORS WITH BUILT-IN EMI SHIELD

(71) Applicant: Apple Inc., Cupertino, CA (US)

(72) Inventors: Gang Ning, Santa Clara, CA (US); Pradeep Vengavasi, Sunnyvale, CA (US); Linda Y. Dunn, Sunnyvale, CA (US); Yonas A. Hartanto, San Jose, CA (US); Shawn X. Arnold, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 129 days.

(21) Appl. No.: 14/500,786

(22) Filed: Sep. 29, 2014

(65) Prior Publication Data

US 2015/0364255 A1   Dec. 17, 2015

Related U.S. Application Data

(60) Provisional application No. 62/012,221, filed on Jun. 13, 2014.

(51) Int. Cl.
*H01G 2/22* (2006.01)
*H01G 4/30* (2006.01)
*H01G 2/06* (2006.01)
*H01G 4/232* (2006.01)
*H01G 4/12* (2006.01)

(52) U.S. Cl.
CPC .............. *H01G 2/22* (2013.01); *H01G 2/065* (2013.01); *H01G 4/232* (2013.01); *H01G 4/30* (2013.01); *H01G 4/12* (2013.01)

(58) Field of Classification Search
CPC   H01G 4/30; H01G 4/12; H01G 2/065; H01G 2/06; H01G 4/228; H01G 2/02; H01G 2/22

See application file for complete search history.

(56) References Cited

U.S. PATENT DOCUMENTS 3,444,436 A * 5/1969 Coda .................. H01G 2/04
361/306.3
4,916,582 A * 4/1990 Okamura ............ H01G 2/22
29/25.42

(Continued)

*Primary Examiner* — Dion R Ferguson
(74) *Attorney, Agent, or Firm* — Downey Brand LLP

(57) ABSTRACT

This disclosure describes methods and systems for minimizing electromagnetic interference (EMI) noise emanating from a ceramic capacitor. The ceramic capacitor may include several terminations are on a bottom portion of the capacitor. The capacitor may be designed to include several capacitors formed from electrode layers. The capacitor may include a conductive coating on an outer peripheral portion. The coating may include conductive materials such as Cu, Ni, Ag, and/or graphite. Alternatively, some regions of the capacitor may include electrode layers built into the capacitor that are not associated with capacitors. In this manner, the ceramic capacitor may be free of the conductive coating to locations proximate to the described electrode layers not associated with capacitors. The conductive coating can act as an electromagnetic shielding to prevent the EMI noise from emanating outside the electromagnetic shielding. Also, the conductive coating can be electrically grounded (e.g., to printed circuit board) via terminals.

18 Claims, 13 Drawing Sheets

(56) References Cited

U.S. PATENT DOCUMENTS

| | | | | |
|---|---|---|---|---|
| 5,624,277 | A | * | 4/1997 | Ward .................. H01R 13/7195 439/620.09 |
| 6,400,551 | B1 | * | 6/2002 | Lin .......................... H01G 2/06 361/301.3 |
| 6,885,538 | B1 | * | 4/2005 | Ishii ........................ H01G 2/06 361/301.3 |
| 8,873,219 | B2 | * | 10/2014 | Perea ....................... H01C 1/14 361/301.4 |

* cited by examiner

CERAMIC CAPACITORS WITH BUILT-IN EMI SHIELD

CROSS-REFERENCE TO RELATED APPLICATION

This application claims priority to U.S. Provisional Application Ser. No. 62/012,221 filed Jun. 13, 2014 entitled "CERAMIC CAPACITORS WITH BUILT-IN EMI SHIELD" which is incorporated herein by reference in its entirety.

FIELD

The described embodiments relate generally to methods and systems for minimizing electromagnetic interference (EMI) noise emanating from an electronic component, and more particularly to methods and systems for minimizing EMI noise emanating from a multi-layer ceramic capacitor (MLCC).

BACKGROUND

Ceramic capacitors in certain applications, such as DC (direct current) blocking, can be used in high speed interface, such as PCIe (Peripheral Component Interconnect Express), USB (Universal Serial Bus), SATA (Serial ATA), HDMI (High-Definition Multimedia Interface), DP (DisplayPort), and TBT. The exposed pads and pins of these ceramic capacitors can emit electromagnetic interference (EMI) emissions. Further, there may be several hundreds of these capacitors in a device or system, contributing to significant EMI noise within an electronic device which houses the capacitors.

SUMMARY

In one aspect, a multi-layered ceramic capacitor (MLCC) having a built-in electromagnetic interference (EMI) shield is described. The MLCC may include a first layer and a second layer. The first layer and the second layer may be selected from a group consisting of ceramic or a dielectric material. The MLCC may further include a first electrode layer and a second electrode layer defining a first capacitor. In some embodiments, the first electrode layer includes a first extension that defines a first electrode, and the second electrode layer includes a second extension that defines a second electrode. In some embodiments, the first electrode and the second electrode extend beyond the first layer and the second layer. The MLCC may further include a third electrode layer and a fourth electrode layer defining a second capacitor. In some embodiments, the third electrode layer includes a third extension that defines a third electrode, and the fourth electrode layer includes a fourth extension that defines a fourth electrode. In some embodiments, the third electrode and the fourth electrode extend beyond the first layer and the second layer. The MLCC may further include a conductive coating applied to an outer peripheral region, wherein the conductive coating provides an EMI shield.

In another aspect, a system is described. The system may include a multi-layered ceramic capacitor (MLCC) having a built-in electromagnetic interference (EMI) shield as well as a printed circuit board (PBC). The MLCC may include a first layer and a second layer. The first layer and the second layer may be selected from a group consisting of ceramic or a dielectric material. The MLCC may further include a first electrode layer and a second electrode layer defining a first capacitor. In some embodiments, the first electrode layer includes a first extension that defines a first electrode, and the second electrode layer includes a second extension that defines a second electrode. In some embodiments, the first electrode and the second electrode extend beyond the first layer and the second layer. The MLCC may further include a third electrode layer and a fourth electrode layer defining a second capacitor. In some embodiments, the third electrode layer includes a third extension that defines a third electrode, and the fourth electrode layer includes a fourth extension that defines a fourth electrode. In some embodiments, the third electrode and the fourth electrode extend beyond the first layer and the second layer. The MLCC may further include a conductive coating applied to an outer peripheral region, wherein the conductive coating provides an EMI shield. The PCB may include several terminals to receive the first electrode, the second electrode, the third electrode, and the fourth electrode.

In another aspect, a method for forming a multi-layered ceramic capacitor is described. The method may include positioning a first electrode layer and a second electrode layer between a first ceramic layer and a second ceramic layer. The first electrode layer and the second electrode layer may define a first capacitor. The method may further include positioning a third electrode layer and a fourth electrode layer between the first ceramic layer and the second ceramic layer. The third electrode layer and the fourth electrode layer may define a second capacitor. The method may further include coating the first layer and the second layer with a conductive coating. In some embodiments, the conductive coating provides an EMI shield the first capacitor and the second capacitor.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This disclosure describes methods and systems for minimizing electromagnetic interference (EMI) noise emanating from a ceramic capacitor by using a built-in EMI shield. This creates a unique design of a ceramic capacitor module. The ceramic capacitor module with built-in EMI shield may include several features, such as terminations are on a lower, or base, region, of the capacitor. Also, the capacitor can be designed to be an array of multiple capacitors. In the described embodiments, the capacitors may include electrode plates perpendicular to the plane of the terminations of the capacitors. Further, a capacitor may include several surfaces coated with conductive material such as Cu, Ni, Ag, and/or graphite, etc. The coating functions as an EMI shield, and is electrically grounded after a capacitor is mounted to a printed circuit board (PCB). In this manner, EMI noise emanating from exposed regions of the capacitor may be contained by the conductive coating. Such a conductive enclosure used to block electromagnetic field is also known as a Faraday cage. Further, a ceramic capacitor module with a built-in EMI shield can also achieve improved volumetric efficiency, since extra external EMI shields are no longer needed.

Figure 1:
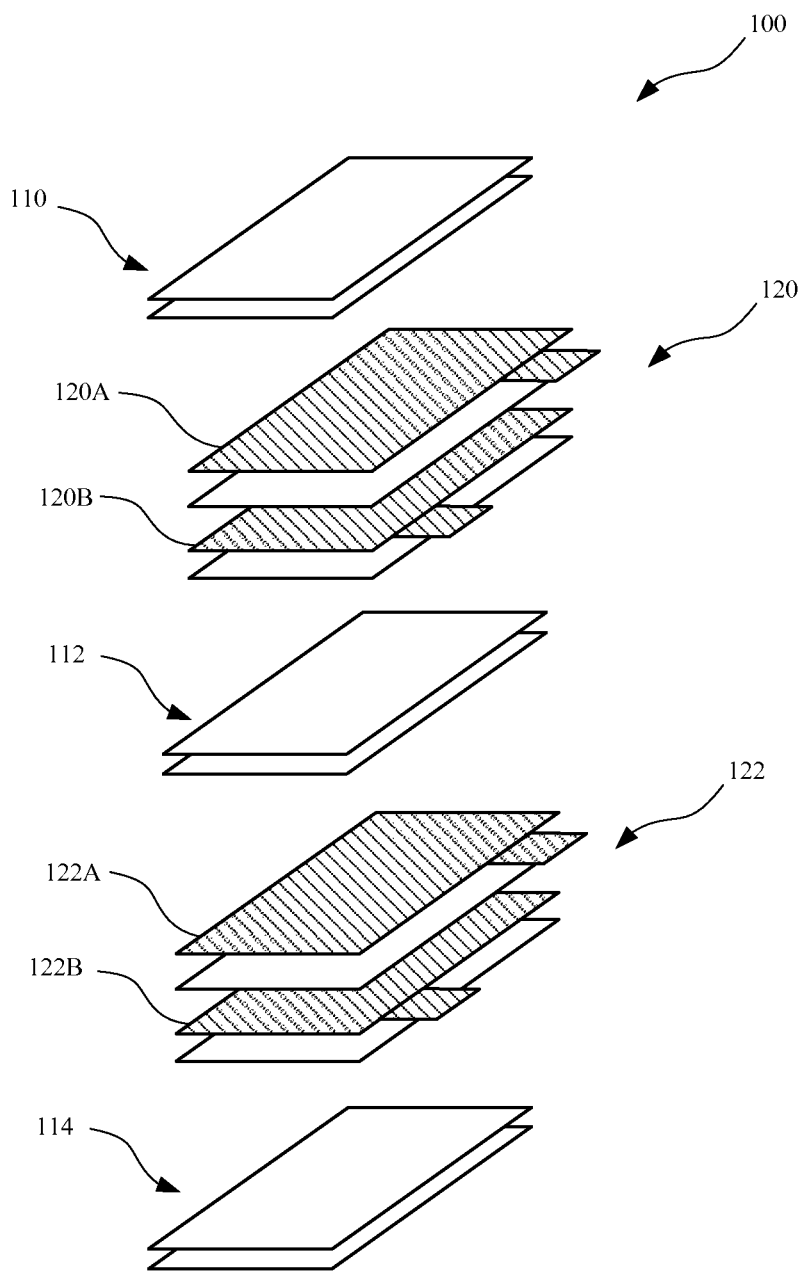
FIG. 1 illustrates an exploded view of internal and external structures of a multi-layer ceramic capacitor (MLCC), in accordance with the described embodiments.

FIG. 1 illustrates an exploded view of internal and external structures of a multi-layer ceramic capacitor 100 (MLCC), in accordance with the described embodiments. MLCC 100 shown in FIG. 1 includes two capacitors. First capacitor 120 includes two electrodes, 120A (+) and 120B (−), both of which are denoted as shaded regions. Also, the plus ("+") sign and the negative ("−") sign used through this detailed description refer to a positive electrode and a negative electrode, respectively. As shown, the two electrode layers, 120A and 120B, are sandwiched in between several layers, including first layer 110, second layer 112, and third layer 114. In some embodiments, first layer 110, second layer 112, and third layer 114 are formed from ceramic. In other embodiments, first layer 110, second layer 112, and third layer 114 are formed from dielectric materials. Second capacitor 122 includes two electrodes, 122A (+) and 122B (−), also denoted as shaded regions. The two electrode layers, 122A and 122B, are also sandwiched in between first layer 110, second layer 112, and third layer 114. In some embodiments, electrode layers 120A, 120B, 122A, and 122B are metallic. In other embodiments, electrode layers 120A, 120B, 122A, and 122B are formed from metallic paste. Also, MLCC 100 may include additional layers (not labeled) positioned between adjacent electrode layers of a capacitors. These layers may be made from any material previously described for first layer 110, second layer 112, and third layer 114.

Figure 2:
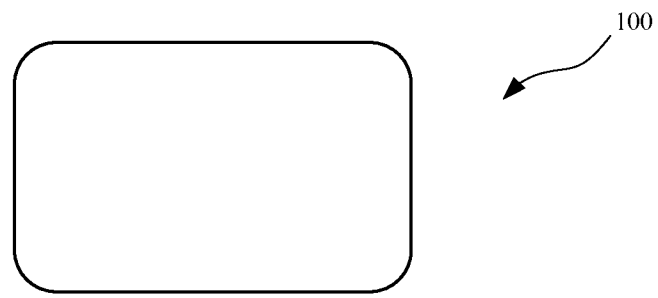
FIG. 2 illustrates a top view of an embodiment of the MLCC shown in FIG. 1.
Figure 3:
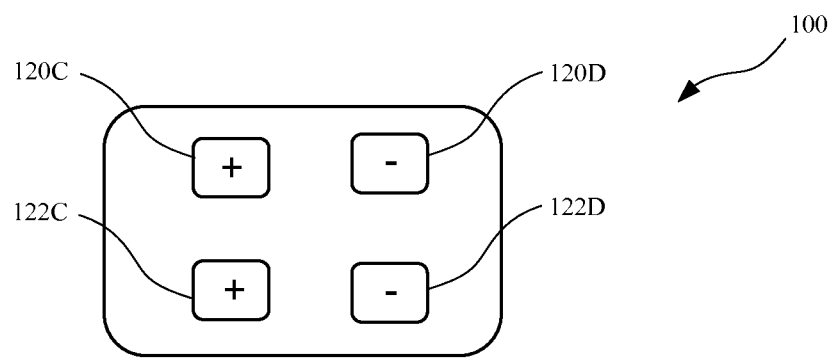
FIG. 3 illustrates a bottom view of the embodiment of the MLCC shown in FIG. 1.
Figure 4:
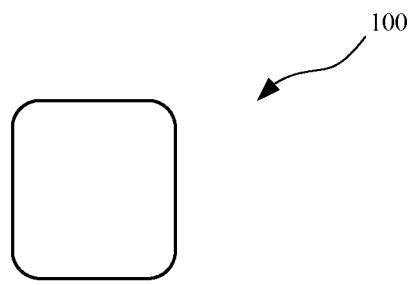
FIG. 4 illustrates a side view of the embodiment of the MLCC shown in FIG. 1.

Also, in some embodiments, these alternating layers of ceramic and electrode layers can be stacked together, laminated, and cut (or diced) to form MLCC 100. FIGS. 2, 3 and 4 illustrate a top view, a bottom view, and a side view of MLCC 100, respectively, in accordance with the described embodiments. In some embodiments, MLCC 100 is configured as a rectangular prism, so each of the top, bottom, and side views displays a rectangular face, as shown in FIGS. 2, 3, and 4. Also, in some embodiments, all the terminations are on a bottom portion of MLCC 100. For example, FIG. 3 shows these terminations labeled 120C, 120D, 122C, and 122D. Terminals 120C and 120D correspond to the positive (+) and the negative (−) terminals, respectively, of first capacitor 120 (shown in FIG. 1). As such, terminals 120C and 120D are electrically coupled to electrode layers 120A (+) and 120B (−), respectively, of first capacitor 120. Similarly, terminals 122C and 122D correspond to the positive (+) and the negative (−) terminals, respectively, of second capacitor 122 (shown in FIG. 1). As such, terminals 122C and 122D are coupled to electrode layers 122A (+) and 122B (−), respectively, of second capacitor 122. Having all the terminations on the bottom face of the MLCC 100 allows for convenient connections to a printed circuit board (PCB) and also for convenient EMI shielding from other components on the PCB.

Figure 5:
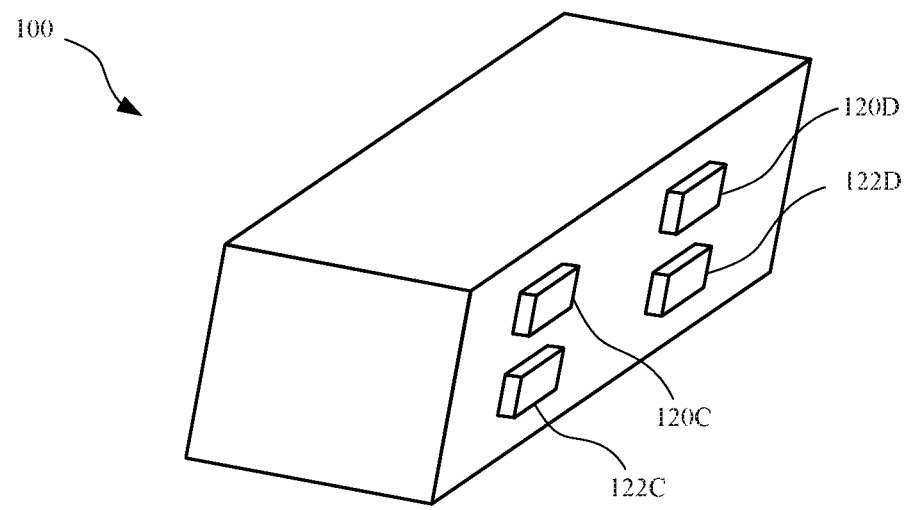
FIG. 5 illustrates an isometric view of the multi-layer ceramic capacitor (MLCC) prior to receiving an EMI shield (e.g., conductive coating)

FIG. 5 illustrates an isometric view of MLCC 100 prior to receiving an EMI shield, with terminals 120C, 120D, 122C, and 122D in a lower region of MLCC 100. In some embodiments, terminal 120C, 120D, 122C, and 122D are formed from materials such as nickel (Ni) and tin (Sn). In other embodiments, terminal 120C, 120D, 122C, and 122D are formed from materials such as silver (Ag) and palladium (Pd). Also, in some embodiments, MLCC 100 uses a land grid array (LGA). In other embodiments, MLCC 100 uses a ball grid array (BGA). Also, in some embodiments, terminals 120C, 120D, 122C, and 122D are electrically connected to a PCB using lead-free solder. In other embodiments, terminal 120C, 120D, 122C, and 122D are electrically connected to a PCB using a conductive adhesive.

Figure 6:
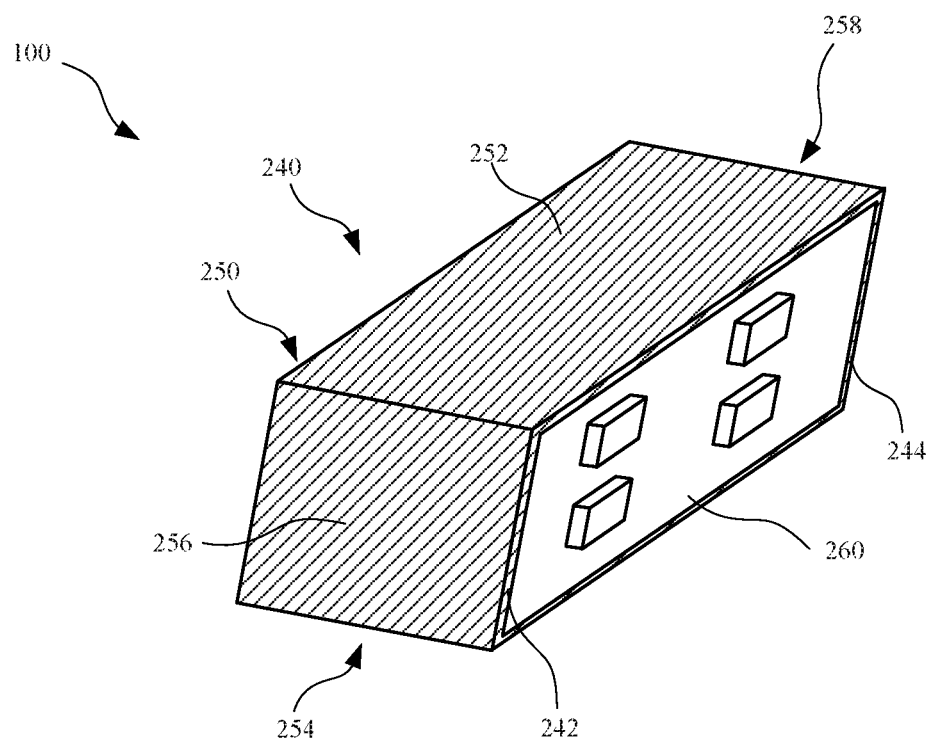
FIG. 6 illustrates an isometric view of the MLCC shown in FIG. 5, with a built-in EMI shield, provided by an external conductive coating, in accordance with the described embodiments.

FIG. 6 illustrates an isometric view of the MLCC 100 shown in FIG. 5, with a built-in EMI shield, provided by an external conductive coating 240, in accordance with the described embodiments. As shown, conductive coating 240 is applied to five faces of the MLCC 100 to form the built-in EMI shield, or a Faraday cage. In some embodiments, the thickness of conductive coating 2e0 is approximately in the range of 2 to 3 μm (micrometers). The five faces covered with the conductive coating 240 include first face 250 (on a top region of MLCC 100), second face 252, third face 254 (opposite second face 252), fourth face 256, and fifth face 258 (opposite fourth face 256). Only the face with the terminals configured to contact a PCB (i.e., sixth face 260 opposite first face 250), may be generally free of conductive coating 240.

In some embodiments, conductive coating 240 is a continuous coating covering all five faces. In some embodiments, conductive coating 240 includes an exposed area or areas (i.e., uncoated openings) on at least one of the aforementioned five faces having conductive coating 240. Further, an exposed area may include a dimension smaller than that of the wavelength of the EMI noise signal. In particular, the dimension of the exposed area(s) may be smaller than the shortest wavelength of the EMI noise signal. In some embodiments, conductive coating 250 includes exposed areas on at least one of the five faces that with conductive coating 240 having a dimension smaller than 1/20 (or 5%) of the wavelength of the EMI noise signal. Further, in some embodiments, conductive coating 240 covers a portion of the bottom face. In this regard, as shown in FIG. 6, conductive coating 240 may further include first terminal 242 and second terminal 244, both of which are configured to provide an electrical grounding path for conductive coating 240. By grounding the conductive coating 240 via terminals 242 and 244, an EMI shield (or a Faraday cage) can be formed with the conductive coating 240.

Conductive coating 240 may be formed from various materials. For example, in some embodiments, conductive coating 240 includes copper (Cu), silver (AG), nickel (Ni), and/or graphite. Also, in some embodiments, conductive coating 240 further includes tin (Sn). Conductive coating 240 may be applied by various techniques. For example, conductive coating 240 may be applied by spraying, dipping, roller coating, and/or other means generally known in the art for applying a conductive coating to an electronic component. In some embodiments, the conductive coating 240 is applied to five faces (or sides) of the MLCC. In some embodiments, terminal 120C, 120D, 122C, and 122D can include Ni/Sn or Ag/Pd. In some embodiments, MLCC 100 uses land grid array (LGA). In other embodiments, MLCC 100 can use ball grid array (BGA). Further, in some embodiments, terminals 120C, 120D, 122C, and 122D are electrically connected to a PCB using solder free of lead (Pb)-free solder. In other embodiments, a conductive adhesive is used to electrically connect terminals 120C, 120D, 122C, and 122D.

Figure 7:
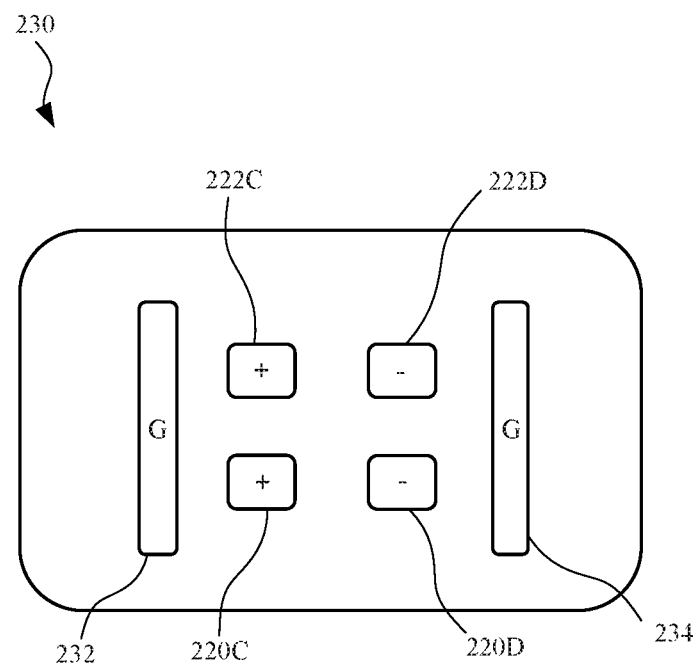
FIG. 7 illustrates a top view of an embodiment of a printed circuit board.

FIG. 7 illustrates a top view of an embodiment of PCB 230. In some embodiments, a grounding terminal on PCB 230 provides a shielding to the exposed areas on the bottom face, or sixth face 260, of the MLCC 100 (shown in FIG. 6). The terminations on the bottom face 260 of MLCC 100 can couple to the terminals on a corresponding PCB, such as PCB 230. PCB 230 includes terminals 220C (+) and 220D (−) for the first capacitor (e.g., first capacitor 120 in FIG. 1) that electrically couple with terminals 120C and 120D (in FIG. 6). PCB 230 also includes terminals 222C (+) and 222D (−) for the second capacitor (e.g., second capacitor 122 in FIG. 1) that couple with terminals 122C and 122D. Also, PCB 230 includes ground terminals 232 and 234 which may electrically couple with other terminals of MLCC 100 (such as first terminal 242 and second terminal 244 of conductive coating 240, shown in FIG. 6).

FIGS. 8-12 illustrate the structures of several MLCCs with an EMI shield, where the EMI shielding is provided by an external conductive coating and the MLCC is composed of an array of multiple capacitors, in accordance with the described embodiments. However, in some embodiments, additional electrode layers not used as capacitors may be used. These electrode layers may serve as EMI shields, and will be discussed below.

Figure 8:
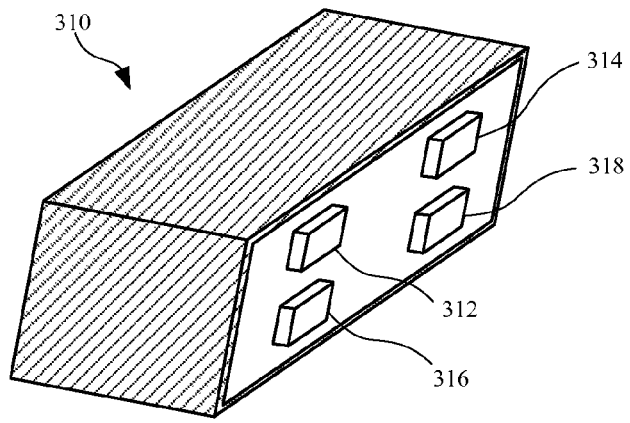
FIG. 8 shows an embodiment of an MLCC having two capacitors.
Figure 9:
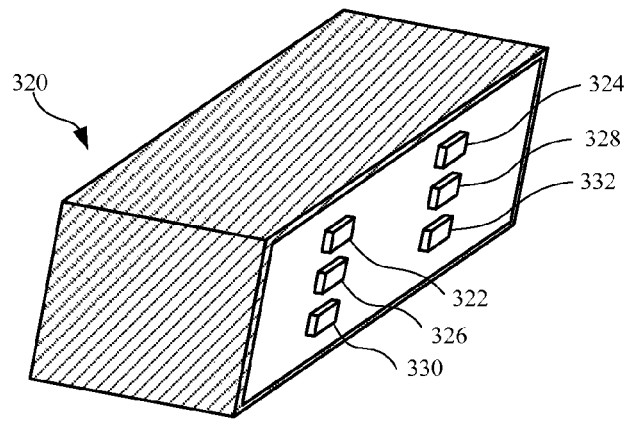
FIG. 9 shows an embodiment of an MLCC having three capacitors.
Figure 10:
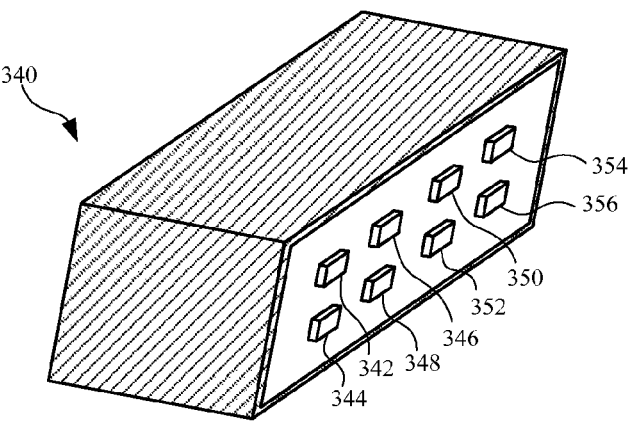
FIG. 10 shows an embodiment of an MLCC having four capacitors.

FIG. 8 shows an embodiment of MLCC 310 having two capacitors, with terminals 312 (+) and 314 (−) associated with a first capacitor, and terminals 316 (+) and 318 (−) associated with a second capacitor. FIG. 9 shows an embodiment of MLCC 320 having three capacitors, with terminals 322 (+) and 324 (−) associated with a first capacitor, terminals 326 (+) and 328 (−) associated with a second capacitor, and terminals 330 (+) and 332 (−) associated with a third capacitor. FIG. 10 shows an embodiment of MLCC 340 having four capacitors, with terminals 342 (+) and 344 (−) associated with a first capacitor, terminals 346 (+) and 348 (−) associated with a second capacitor, terminals 350 (+) and 352 (−) associated with a third capacitor, and terminals 354 (+) and 356 (−) associated with a fourth capacitor. FIGS. 8-10 illustrate how the capacitors can be arranged in various manners. For example, FIGS. 8 and 9 show capacitors in a vertical arrangement, that is, the capacitors form a single column. However, FIG. 10 shows capacitors in a horizontal arrangement, that is, the capacitors form a single row.

Figure 11:
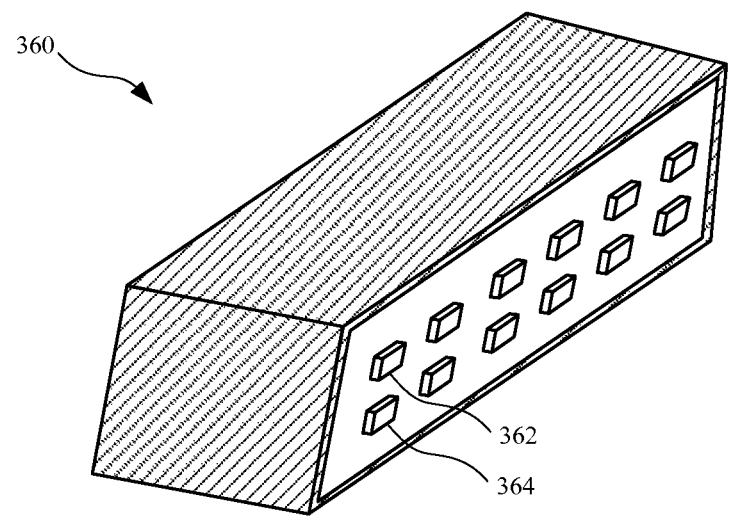
FIG. 11 shows an embodiment of an MLCC having six capacitors.
Figure 12:
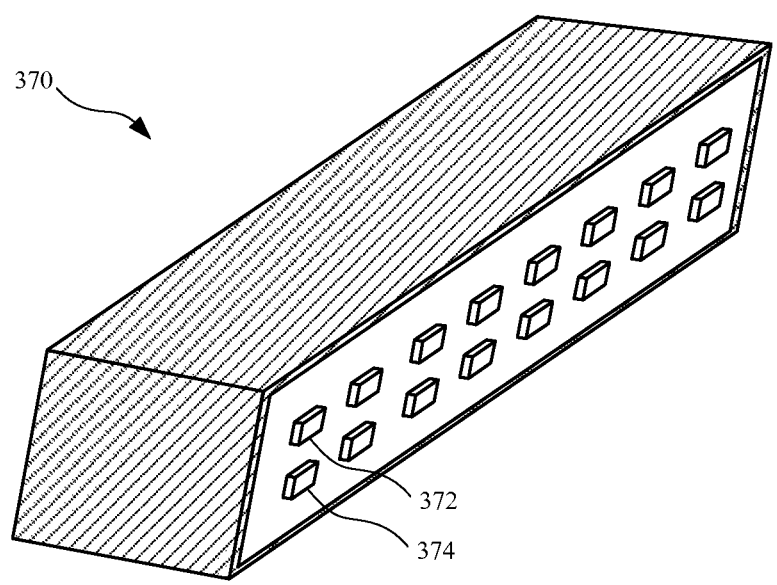
FIG. 12 shows an embodiment of an MLCC having eight capacitors.

FIG. 11 illustrates MLCC 360 having a row of six capacitors, with an exemplary first capacitor having terminals 362 (+) and 364 (−). FIG. 12 illustrates MLCC 370 having a row of eight capacitors, with an exemplary first capacitor having terminals 372 (+) and 374 (−). Although not shown, additional capacitors can be added to an array of capacitors on an MLCC. Generally, an MLCC can accommodate any number of capacitors.

Figure 13:
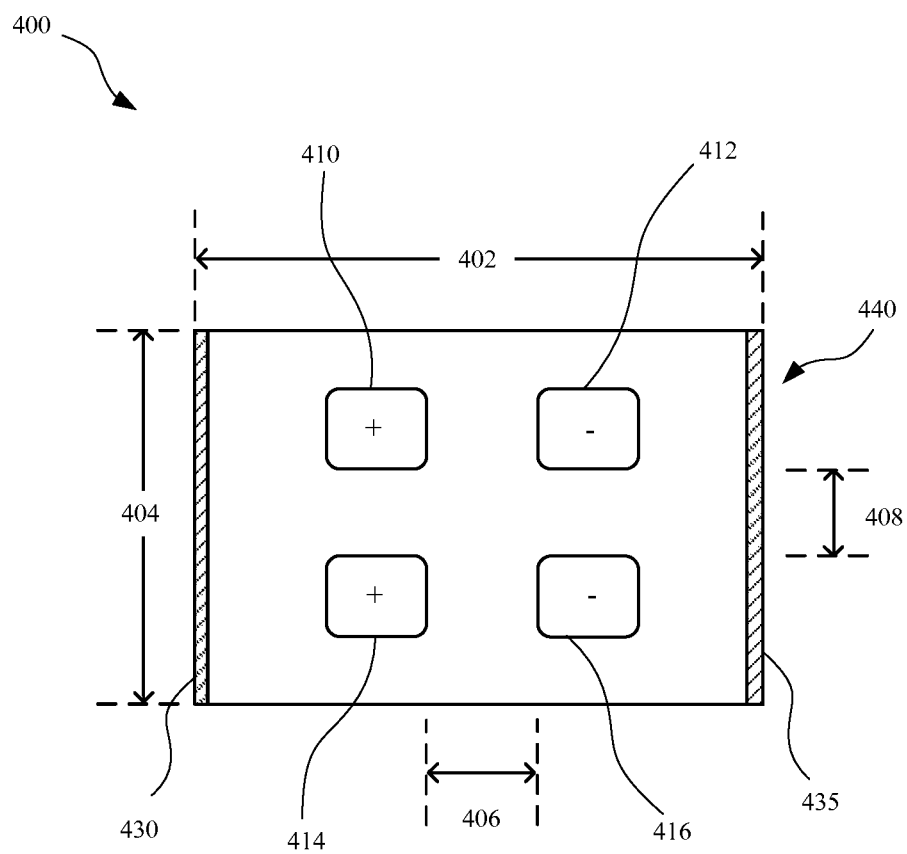
FIG. 13 illustrates a bottom view of an embodiment of an MLCC, showing representative dimensions of an MLCC.

FIG. 13 illustrates a bottom view of an embodiment of MLCC 400, showing representative dimensions of MLCC 400. For example, MLCC 400 may include first dimension 402 approximately in the range of 0.8 to 1.2 mm. First dimension 402 may include some dimensions of conductive coating 440. MLCC 400 may further include second dimension 404 approximately in the range of 0.4 to 0.7 mm. Also, terminals 410 (+) and 412 (−) of a capacitor may be spaced apart by a distance 406 approximately in the range of 0.17 to 0.23 mm. It will be appreciated that this distance 406 applies to terminals 414 (+) and 416 (−). Also, adjacent capacitors may be spaced apart by a distance 408 approximately in the range of 0.17 to 0.23 mm. Further, terminals 410, 412, 414, and 416 can be square-shaped pads having dimensions of approximately 0.20 mm×0.20 mm. In some embodiments, the surface finish of the terminal 410, 412, 414, and 416 are formed from Cu/Ni/Sn. Terminals 410, 412, 414 and 416 may be configured to couple with, for example, terminals 220C, 222C, 220D, and 222D (shown in FIG. 7). Also, in some embodiments, the EMI shielding materials of the conductive coating 440 include a conductive copper (Cu) paint mixed with Ni and/or Sn. In this manner, conductive coating 440 may be coupled to a terminal on a PCB (such as grounding terminals 232 and 234, shown in FIG. 7) to provide an electrical grounding path for conductive coating 440.

Figure 14:
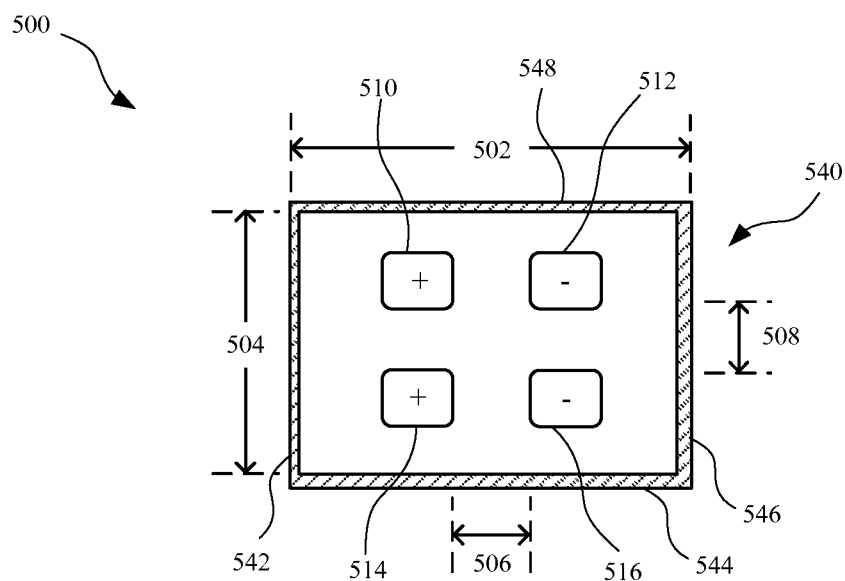
FIG. 14 illustrates a bottom view of an alternate embodiment of an MLCC, showing representative dimensions of an MLCC.

FIG. 14 illustrates a bottom view of an alternative embodiment of an MLCC, showing representative dimensions of MLCC 500. For example, MLCC 500 may include first dimension 502 approximately in the range of 0.8 to 1.2 mm. First dimension 502 may include some dimensions of conductive coating 540. MLCC 500 may further include second dimension 504 approximately in the range of 0.6 to 0.9 mm. Also, terminals 510 (+) and 512 (−) of a capacitor may be spaced apart by a distance 506 approximately in the range of 0.20 to 0.24 mm. It will be appreciated that this distance 506 applies to terminals 514 (+) and 516 (−). Also, adjacent capacitors may be spaced apart by a distance 508 approximately in the range of 0.20 to 0.24 mm. Further, terminals 510, 412, 414, and 416 can be square-shaped pads having dimensions of approximately 0.20 mm×0.20 mm. In some embodiments, the surface finish of the terminal 510, 512, 514, and 516 are formed from Cu/Ni/Sn. Also, in some embodiments, the EMI shielding materials of the conductive coating 540 include conductive copper (Cu) paint mixed with Ni and/or Sn.

Conductive coating 540 may include terminals 542, 544, 546, and 548 positioned on an outer peripheral portion of MLCC 500. Terminals 542, 544, 546, and 548 may electrically couple to a PCB having corresponding grounding terminals. In this manner, conductive coating 540 may be coupled to a terminal on a PCB to provide an electrical grounding path for conductive coating 540.

Figure 15:
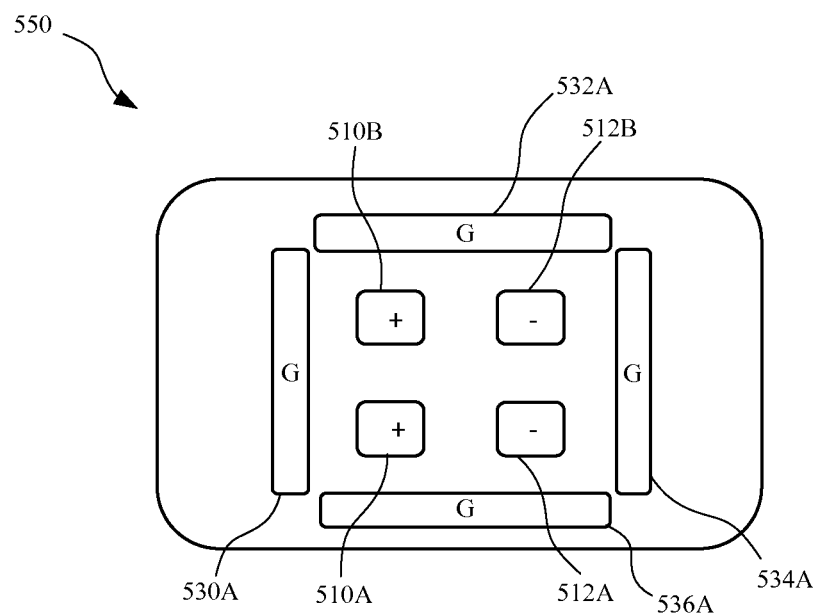
FIG. 15 illustrates a top view of an alternative embodiment of a PCB having four grounding terminals.

FIG. 15 illustrates a top view of an alternative embodiment of a PCB. In this embodiment, PCB 550 may include terminal 510A (+) and 512A (−) configured to electrically couple with terminals 510 and 512 (shown in FIG. 14), respectively, of a first capacitor. PCB 550 may further include terminal 510B (+) and 512B (−) configured to electrically couple with terminals 514 and 516 (shown in FIG. 14), respectively, of a second capacitor. Also, PCB 550 may include grounding terminals 530A and 534A configured to electrically couple with terminals 542 and 546, respectively, of conductive 540 (shown in FIG. 14). Also, PCB 550 may further include grounding terminals 532A and 536A configured to electrically couple with terminals 544 and 548, respectively, of conductive 540 (shown in FIG. 14). Having four grounding terminals instead of two grounding terminals may provide for better grounding for conductive coating 540, which in turn may provide for better EMI shielding. In some embodiments, instead having four distinct terminals 530A, 532A, 534A, and 536A, PCB 550 includes a grounding terminal having four sides that define a rectangle. In other words, the four distinct terminals 530A, 532A, 534A, and 536A may be combined to form a single grounding terminal. Generally, a single grounding terminal may be any closed polygonal or curved configuration.

Figure 16:
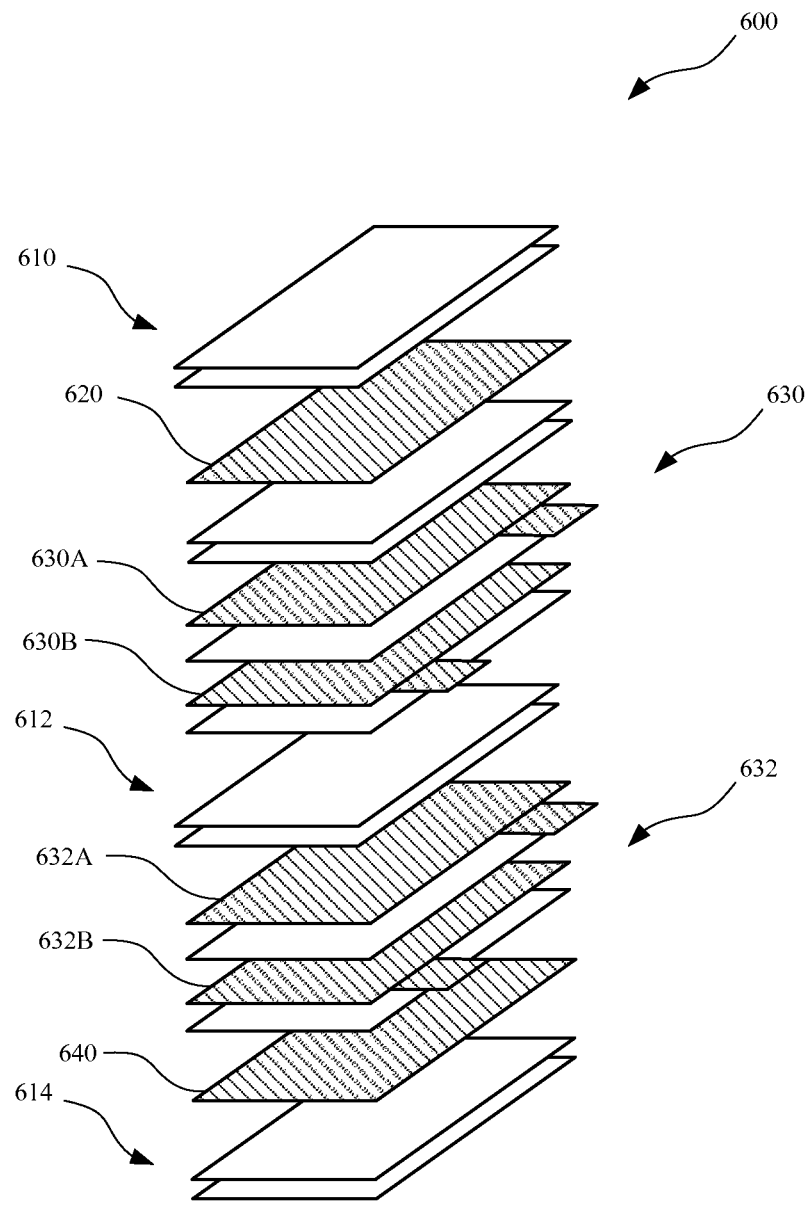
FIG. 16 illustrates an exploded view of internal and external structures of an alternate embodiment of a multi-layer ceramic capacitor (MLCC), in accordance with the described embodiments.

FIG. 16 illustrates an exploded view of internal and external structures of an MLCC with a built-in EMI shield, where a part of the EMI shielding is provided by electrode plates, in accordance with the described embodiments. Similar to MLCC 100 (in FIG. 1), MLCC 600 shown in FIG. 16 includes two capacitors. First capacitor 630 includes two electrode layers, 630A (+) and 630B (−), both of which are denoted as shaded regions. As shown, electrode layers 630A and 630B, are sandwiched in between first layer 610, second layer 612, and third layer 614. In some embodiments, first layer 610, second layer 612, and third layer 614 are formed from ceramic or a ceramic-like material. In other embodiments, first layer 610, second layer 612, and third layer 614 are formed from dielectric materials. Second capacitor 632 includes two electrode layers, 632A (+) and 632B (−), that are also sandwiched in between first layer 610, second layer 612, and third layer 614. Also, MLCC 600 may include additional layers (not labeled and not shaded) positioned between adjacent electrode layers of the capacitors. These layers may be made from any material previously described for first layer 610, second layer 612, and third layer 614.

In some embodiments, MLCC 600 includes additional electrode layers. For example, FIG. 16 shows electrode layers 620 and 640, which can act as a built-in EMI shield for those portions of MLCC 600 in which they cover. In FIG. 16, electrode layer 620 covers a surface or face of MLCC 600 (similar to second face 252 shown in FIG. 6), while electrode layer 640 covers a surface or face of MLCC 600 (similar to third face 254 shown in FIG. 6). In some embodiment, the electrode layers shown in FIG. 16 are metallic. In other embodiment, the electrode layers shown in FIG. 16 are formed from a metallic paste.

Figure 17:
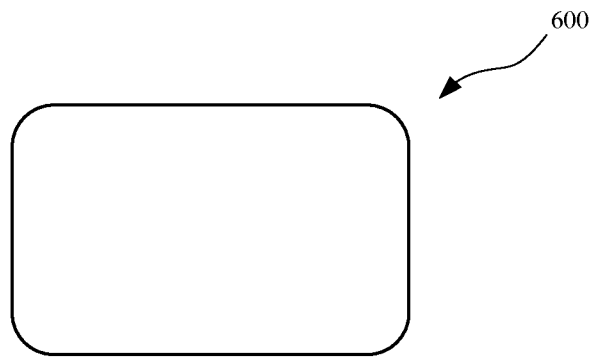
FIG. 17 illustrates a top view of an embodiment of the MLCC shown in FIG. 16.
Figure 18:
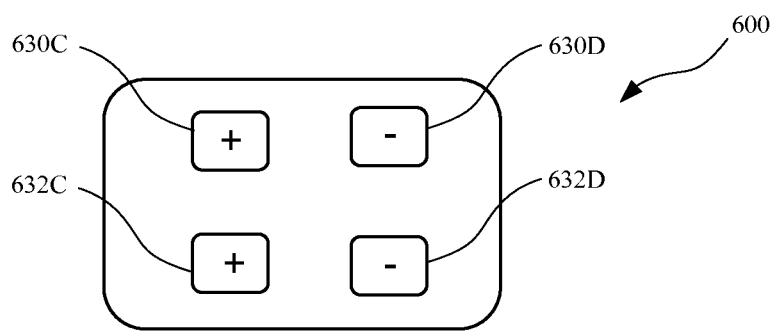
FIG. 18 illustrates a bottom view of the embodiment of the MLCC shown in FIG. 16.
Figure 19:
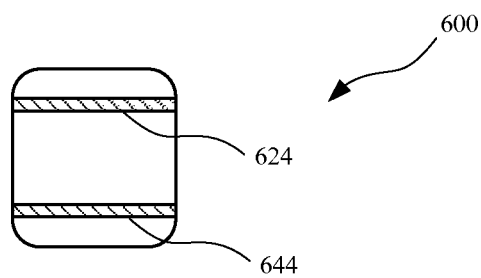
FIG. 19 illustrates a side view of the embodiment of the MLCC shown in FIG. 16.

These alternating layers of electrode and non-electrode (e.g., ceramic) layers can be stacked together, laminated, and cut (or diced) to form MLCC 600. FIGS. 17-19 illustrate a top view, a bottom view, and a side view of the MLCC 600, respectively, in accordance with the described embodiments. In some embodiments, MLCC 600 is configured as a rectangular prism, so each of the top, bottom, and side views displays a rectangular face, as shown in FIGS. 17-19, respectively. In some embodiments, all the terminations are on a bottom portion of MLCC 600. For example, FIG. 18 illustrates these terminations labeled 630C, 630D, 632C, and 632D. Terminals 630C and 630D correspond to the positive (+) and the negative (−) terminals, respectively, of first capacitor 630 (shown in FIG. 16). As such, terminals 630C and 630D are coupled to electrode layers 630A (+) and 630B (−), respectively. Similarly, terminals 632C and 632D correspond to the positive (+) and the negative (−) terminals, respectively, of second capacitor 632 (shown in FIG. 16). As such, terminals 632C and 632D are coupled to electrode layers 632A (+) and 632B (−), respectively. FIG. 19 illustrates a side view of MLCC 600 showing electrode strips 624 and 644, corresponding to electrode layers 620 and 640, respectively (shown in FIG. 16). In some embodiments, electrode strips 624 and 644 are formed from a metallic material or materials. Electrode strips 624 and 644 may be exposed to provide an additional contact for grounding. Alternatively, electrode strips 624 and 644 may be fully embedded with MLCC 600 such that electrode strips 624 and 644 are not visible.

Figure 20:
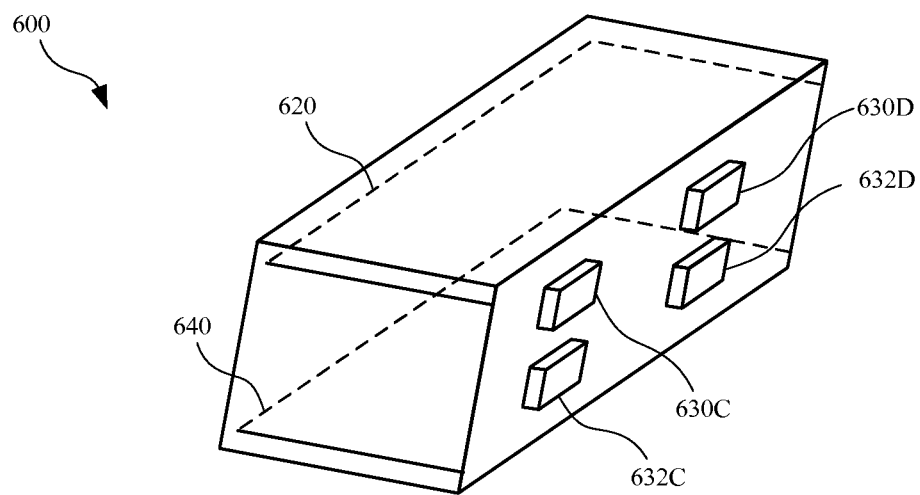
FIG. 20 illustrates an isometric view of an embodiment of MLCC showing internal features of the MLCC, such as a pair of electrode layers, prior to receiving a conductive coating, in accordance with the described embodiments.

FIG. 20 illustrates an isometric view of MLCC 600 showing internal features of MLCC 600, such as electrode layers 620 and 640, prior to receiving a conductive coating, in accordance with the described embodiments. Also, MLCC 600 may include terminals 630C, 630D, 632C, and 632D in a lower region of MLCC 600. Terminals 630C, 630D, 632C, and 632D may be formed from a material or materials previously described for terminals in a lower region of an MLCC 600. Also, MLCC 600 may include various arrangements previously described (e.g., LGA).

Figure 21:
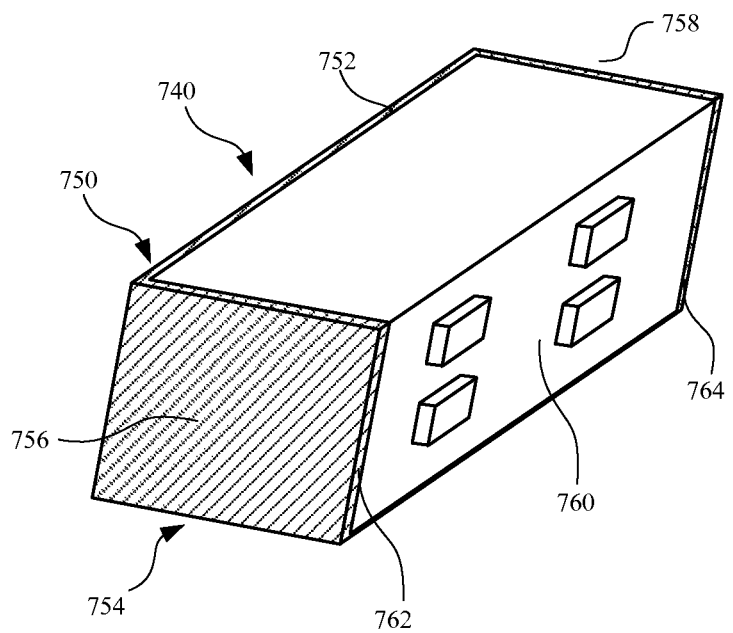
FIG. 21 illustrates an isometric view of the MLCC shown in FIG. 20, with a built-in EMI shield, provided by an external conductive coating, in accordance with the described embodiments.

FIG. 21 illustrates an isometric view of the MLCC 600 shown in FIG. 20, with an EMI shield, provided by an external conductive coating 740, in accordance with the described embodiments. As shown, FIG. 21 includes first face 750, second face 752, third face 754 (opposite second face 752), fourth face 756, and fifth 758 (opposite fourth face 756). In some embodiments, conductive coating 740 may be applied to multiple surfaces or faces of MLCC 600. In the embodiment shown in FIG. 21, conductive coating 740 is applied to a first face 750, fourth face 756, and fifth face 758. MLCC 600 may not require conductive coating 740 on second face 752 and third face 754, due in part to electrodes layer 620 and 640. Also, in some embodiments, MLCC 600 may include exposed areas (i.e., uncoated openings) similar to those previously described, and having dimensions substantially similar to those previously described. Also, as shown, MLCC 600 includes sixth face 760 substantially free of conductive coating 740. Sixth face 760 may be associated with a face having the terminals. Also, conductive coating 740 may include terminals 762 and 764 configured to electrically ground conductive coating 740 and MLCC 600.

Figure 22:
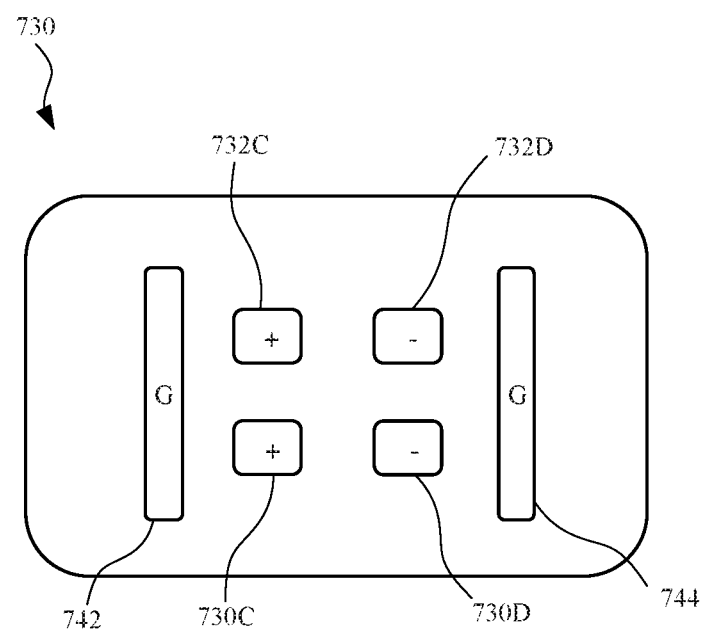
FIG. 22 illustrates a top view of an embodiment of a printed circuit board, in accordance with the described embodiments.

FIG. 22 illustrates a top view of an embodiment of PCB 730. In some embodiments, a grounding terminal on PCB 730 provides a shielding to the exposed areas on the bottom face, or sixth face 760, of the MLCC 600 (shown in FIG. 20). The terminations on the bottom face 760 of MLCC 600 can couple to the terminals on a corresponding PCB, such as PCB 730. PCB 730 includes terminals 730C (+) and 730D (−) for the first capacitor (e.g., first capacitor 630 in FIG. 16) that electrically couple with terminals 630C and 630D (in FIG. 20). PCB 730 also includes terminals 732C (+) and 732D (−) for the second capacitor (e.g., second capacitor 632 in FIG. 16) that couple with terminals 632C and 632D (in FIG. 20). Also, PCB 230 includes ground terminals 742 and 744 which may electrically couple with other terminals (such as first terminal 762 and second terminal 764 in FIG. 21).

Other embodiments of the ceramic capacitor module are also possible. In some embodiments, the EMI noise emanating from a ceramic capacitor includes 2.4 GHz and 5.0 GHz noise harmonics. In some embodiments, the conductive coating can include a light conductive polymer coating. In other embodiments, the conductive coating can include a polymer coating with metal fillers. Still, in other embodiments, the conductive coating can include an electroplated coating. In some embodiments, a copper-based conductive coating can be used as EMI shielding for high frequency EMI noise. In some embodiments, the conductive EMI shield can be formed using material with a resistivity that provides for good shielding against the anticipated frequencies of the EMI noise.

Figure 23:
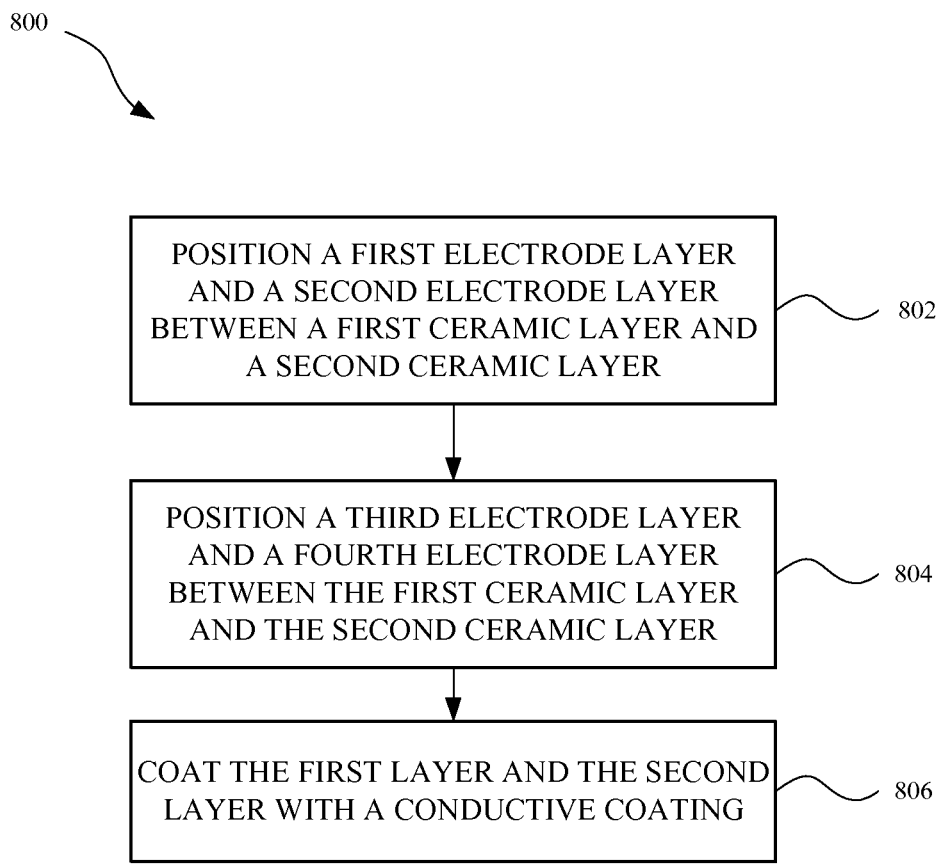
FIG. 23 illustrates a flowchart showing a method for forming a multi-layered ceramic capacitor, in accordance with the described embodiments.

FIG. 23 illustrates a flowchart 800 showing a method for forming a multi-layered ceramic capacitor, in accordance with the described embodiments. In step 802, a first electrode layer and a second electrode layer are positioned between a first ceramic layer and a second ceramic layer. The first electrode layer and the second electrode layer may define a first capacitor. In step 804, a third electrode layer and a fourth electrode layer between the first ceramic layer and the second ceramic layer. The third electrode layer and the fourth electrode layer may define a second capacitor.

In step 806, the first layer and the second layer are coated with a conductive coating. In some embodiments, the conductive coating provides an EMI shield the first capacitor and the second capacitor. In cases where the MLCC is a six-sided structure, at least three sides may include a coating on an outer peripheral portion. In some embodiments, electrode layers are embedded between the ceramic layers (e.g., first ceramic layer and second ceramic layer).

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A multi-layered capacitor assembly, comprising:
   a housing defining a cavity, the housing having a first wall and a second wall, the first wall including at least a ceramic or a dielectric material;
   a first capacitor positioned in the cavity, the first capacitor having a first pair of electrode layers;
   a second capacitor positioned in the cavity, the second capacitor having a second pair of electrode layers;
   an electrically conductive layer coupled with and disposed internally with respect to the first wall; and
   an electrically conductive coating applied to the housing on the second wall, wherein the conductive coating and the electrode layer form an electromagnetic interference shield that electrically isolates the first capacitor and the second capacitor, and wherein the electrically conductive coating is applied to the housing at a location other than the first wall.

2. The multi-layered capacitor assembly of claim 1, further comprising a dielectric layer positioned between the first capacitor and the second capacitor.

3. The multi-layered capacitor assembly of claim 1, wherein the housing comprises a six-sided configuration that includes a first face, a second face, a third face, a fourth face, a fifth face, and a sixth face.

4. The multi-layered capacitor assembly of claim 3, wherein:
the first capacitor includes a first electrode and a second electrode, each of which extend behind the housing,
the second capacitor includes a third electrode and a fourth electrode, each of which extend behind the housing,
the first electrode, the second electrode, the third electrode, and the fourth electrode are located at the sixth face, and
the sixth face is free of the conductive coating.

5. The multi-layered capacitor assembly of claim 3, wherein the electrically conductive coating comprises a terminal proximate to the sixth face, the terminal providing an electrical grounding path for the conductive coating to a first grounding terminal of a PCB.

6. The multi-layered capacitor assembly of claim 5, wherein the electrically conductive coating comprises a second terminal proximate to the sixth face, the second terminal providing a second electrical grounding path for the conductive coating to a second grounding terminal of the PCB.

7. The multi-layered capacitor assembly of claim 3, further comprising a second electrically conductive layer wherein the electrically conductive layer and the second electrically conductive layer define a third capacitor.

8. The multi-layered capacitor assembly of claim 7, wherein the first capacitor and the second capacitor are positioned between the electrically conductive layer and the second electrically conductive layer.

9. A system, comprising:
a multi-layered capacitor assembly, comprising:
a first layer and a second layer, the first layer and the second including at least a ceramic or a dielectric material,
a first capacitor having a first electrode layer and a second electrode layer, the first capacitor positioned between the first layer and the second layer, the first capacitor including a first electrode and a second electrode that extend beyond the first layer and the second layer,
a second capacitor having a third electrode layer and a fourth electrode layer, the second capacitor positioned between the first layer and the second layer, the second capacitor including a third electrode and a fourth electrode that extend beyond the first layer and the second layer,
a third capacitor that includes a first metallic layer positioned between the first layer and the first capacitor, the third capacitor further including a second metallic layer positioned between the second layer and the second capacitor;
a conductive coating applied to multi-layered capacitor assembly, wherein the conductive coating provides an electromagnetic interference shield; and
a printed circuit board having a plurality of terminals to receive the first electrode, the second electrode, the third electrode, and the fourth electrode, wherein the first layer and the second layer are free of the conductive coating.

10. The system of claim 9, wherein:
the conductive coating comprises a first terminal and a second terminal,
the printed circuit board comprises a first terminal and a second terminal,
the first terminal of the printed circuit board receives the first terminal of the conductive coating, and
the second terminal of the printed circuit board receives the second terminal of the conductive coating.

11. The system of claim 10, the plurality of terminals of the printed circuit board comprising a third terminal that receives the first electrode of the first capacitor, and a fourth terminal that receives the third electrode of the second capacitor.

12. The system of claim 9, wherein the electromagnetic interference shield is separate from the first capacitor, the second capacitor, and the third capacitor.

13. A method for forming a multi-layered capacitor assembly that includes a housing, the method comprising:
positioning, between a first layer and a second layer, a first capacitor and a second capacitor, the first layer and the second layer including at least a ceramic or a dielectric material;
positioning a first electrically conductive layer between the first layer and the first capacitor;
positioning a second electrically conductive layer between the second layer and the second capacitor; and
receiving a conductive coating to the housing in a location other than the first layer and the second layer, the conductive coating providing an electromagnetic interference shield for the housing.

14. The method of claim 13, wherein the first capacitor includes a first electrode and the second capacitor includes a second electrode, the first electrode and the second electrode extending beyond the first layer and the second layer.

15. The method of claim 13, further comprising positioning a third ceramic layer between the first capacitor and the second capacitor.

16. The method of claim 13, wherein the conductive coating comprises a terminal that provides an electrical grounding path for the conductive coating.

17. The method of claim 13, wherein the conductive coating include a thickness less than 10 micrometers.

18. The method of claim 13, further comprising forming a third capacitor with the first electrically conductive layer and the second electrically conductive layer.

* * * * *